(12) United States Patent
Proctor et al.

(10) Patent No.: US 9,062,276 B2
(45) Date of Patent: Jun. 23, 2015

(54) CONJUGATED LINOLEIC ACID RICH VEGETABLE OIL PRODUCTION FROM LINOLEIC RICH OILS BY HETEROGENEOUS CATALYSIS

(71) Applicant: Board of Trustees of the University of Arkansas, Little Rock, AR (US)

(72) Inventors: Andrew Proctor, Fayetteville, AR (US); Utkarsh Shah, Maharashtra (IN)

(73) Assignee: Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 13/692,619

(22) Filed: Dec. 3, 2012

(65) Prior Publication Data

US 2014/0154393 A1    Jun. 5, 2014

(51) Int. Cl.
C11C 3/14    (2006.01)
A23D 7/005   (2006.01)
C11C 3/00    (2006.01)

(52) U.S. Cl.
CPC ............... *C11C 3/14* (2013.01); *A23D 7/0053* (2013.01); *A23D 7/0056* (2013.01); *C11C 3/00* (2013.01)

(58) Field of Classification Search
None
See application file for complete search history.

(56) References Cited

U.S. PATENT DOCUMENTS

| | | | |
|---|---|---|---|
| 4,203,911 A | 5/1980 | Scarpiello et al. | |
| 5,719,301 A * | 2/1998 | Sleeter | 554/24 |
| 6,127,562 A | 10/2000 | Cain et al. | |
| 6,153,774 A | 11/2000 | Seidel | |
| 6,344,230 B2 * | 2/2002 | Remmereit | 426/601 |
| 6,380,409 B1 | 4/2002 | Saebo et al. | |
| 6,432,469 B1 * | 8/2002 | Remmereit | 426/630 |
| 6,440,931 B1 | 8/2002 | Remmereit et al. | |
| 6,479,683 B1 * | 11/2002 | Abney et al. | 554/126 |
| 6,524,527 B2 * | 2/2003 | Fimreite et al. | 426/648 |
| 6,743,931 B2 | 6/2004 | Saebo et al. | |
| 6,953,583 B1 | 10/2005 | Ghisalberti | |
| 7,101,914 B2 | 9/2006 | Jerome et al. | |
| 7,179,929 B2 | 2/2007 | Horlacher et al. | |
| 7,417,159 B2 | 8/2008 | Galvez et al. | |
| 7,700,833 B2 | 4/2010 | Renz et al. | |
| 7,776,353 B1 | 8/2010 | Saebo et al. | |

(Continued)

FOREIGN PATENT DOCUMENTS

BR    WO0117374 A1    3/2001
DE    2005010345      6/2006

(Continued)

OTHER PUBLICATIONS

Bernas et al. 2003. Applied Catalysis A:General 245:257.*

(Continued)

*Primary Examiner* — Carolyn Paden
(74) *Attorney, Agent, or Firm* — Head, Johnson & Kachigian, P.C.

(57) ABSTRACT

The invention is generally directed to conjugated linoleic acid (CLA)-rich vegetable oil production from linoleic rich oils by heterogeneous catalysis. A heterogeneous catalytic vacuum distillation process is used under high temperature conditions to isomerize linoleic acid in triacylglyceride vegetable oils to CLA to produce CLA-rich oils. After processing, the catalyst may be removed by filtration or centrifugation to obtain high quality, CLA-rich oils. The CLA-rich oils may then serve as a potent and bioactive nutraceutical and can be incorporated into various food products, such as a CLA-rich dressing, margarine or chips.

25 Claims, 1 Drawing Sheet

(56) References Cited

U.S. PATENT DOCUMENTS

| | | | |
|---|---|---|---|
| 7,820,842 B2* | 10/2010 | Luchini et al. | 554/156 |
| 2004/0225141 A1* | 11/2004 | Rongione et al. | 554/126 |
| 2006/0041017 A1 | 2/2006 | Chopra | |
| 2006/0105033 A1 | 5/2006 | Bendich | |
| 2006/0178521 A1* | 8/2006 | Rubin et al. | 554/126 |
| 2006/0241313 A1* | 10/2006 | Sleeter | 554/141 |
| 2006/0281814 A1* | 12/2006 | Angers et al. | 514/560 |
| 2007/0191619 A1 | 8/2007 | Rongione et al. | |
| 2008/0200706 A1* | 8/2008 | Saebo et al. | 554/126 |
| 2008/0214852 A1* | 9/2008 | Sleeter | 554/141 |
| 2009/0042985 A1 | 2/2009 | Bhaggan | |
| 2010/0311835 A1 | 12/2010 | Bell et al. | |
| 2011/0039932 A1* | 2/2011 | Luchini et al. | 514/560 |
| 2013/0190399 A1* | 7/2013 | Raman et al. | 514/560 |

FOREIGN PATENT DOCUMENTS

| | | |
|---|---|---|
| DE | 102005010345 | 6/2006 |
| EP | 0040577 | 11/1981 |
| EP | 1097708 B1 | 9/2003 |
| EP | 823895 B1 | 7/2005 |
| EP | WO2008052709 A2 | 5/2008 |
| EP | 1656034 B1 | 7/2008 |
| EP | WO2009127398 A2 | 10/2009 |
| GB | WO9813330 A1 | 4/1998 |
| GB | WO9840059 A1 | 9/1998 |
| JP | WO2005084661 A1 | 9/2005 |
| JP | WO2007023588 A1 | 1/2007 |
| MX | WP20100039019 A1 | 4/2010 |
| WO | WO0209693 A2 | 2/2002 |
| WO | 2005067888 | 7/2005 |
| WO | WO2008034129 | 3/2008 |
| WO | 2012068645 | 5/2012 |

OTHER PUBLICATIONS

Bernas et al. 2002. Journal of Catalysis 210:354.*
Larock et al. 2001 JAOCS 78:447.*
Quirino et al. 2012. JAOCS 89:1113.*
Jung et al. 2001. Journal of Agricultural and Food Chemistry 49(6)3010.*
Andjelkovic et al. 2006. Journal of Agricultural and Food Chemistry 54:9535.*
Belury MA. (2002) Dietary Conjugated Linoleic Acid in Health: Physiological Effects and Mechanism of Action. Annu. Rev. Nutr. 22:505-31.
Feitoza AB, Pereira AF, Ferreira da Costa N, Ribeiro BG. (2009) Conjugated Linoleic Acid (CLA): effect modulation of body composition and lipid profile. Nutr Hosp. 24:422-428.
Berven G, Bye A, Hals O, Blankson H., Fagertun H, Thom. E, Wadstein J, Gudmundsen O (2000) Safety of conjugated linoleic acid (CLA) in overweight or obese human volunteers. Eur J Lipid Sci Technol 102:455-62.
Blankson H, Stakkestad JA, Fagertun H, Thom E, Wadstein J, Gudmundsen O.(2000) Conjugated linoleic acid reduces body fat mass in overweight and obese humans. J Nutr. 12:2943-8.
Mougios V, Matsakas A, Petridou A, Ring S, Sagredos A, Melissopoulou A, Tsigilis N, Nikolaidis M.(2001) Effect of supplementation with conjugated linoleic acid on human serum lipids and body fat. J Nutr Biochem. 12:585-594.
Christie WA (2001) A practical guide to the analysis of conjugated linoleic acid. Inform 12:147-152.
Jain VP, Proctor A, Lall RK (2008) Pilot-scale production of conjugated linoleic acid-rich soy oil by photoirradiation. J. Food Sci. 73: E183-E192.
Jain, V. P.; Proctor, A. Kinetics of photoirradiation-induced synthesis of soy oil conjugated linoleic acid isomers.(2007) J. Agric. Food Chem., 55,889-894.
Jain, V. P.; Proctor, A. Photocatalytic production and processing of conjugated linoleic acid-rich soy oil.(2006) J. Agric. Food Chem. 54,5590-5596.
Gilbert W, Gadang V, Proctor A, Jain V, Katwa L, Gould A, Devareddy L (2011) trans,trans-Conjugated linoleic acid rich soybean oil increases PPAR-gene expression and alleviates insulin resistance and cardiovascular risk factors. Lipids 46:961-968.
Shah, U., Proctor, A., Lay, J.O, Moon, K. J. (2012) CLA-rich soy oil trans,trans CLA fatty acid chromatographic behavior and positional isomerism. J Am Oil Chem Soc. 89:979-985.
Shah, U., Proctor, A., Lay, J.O (2012) Significance of 4-phenyl-1,2,4-triazoline-3,5-dione (PTAD) in the GC-MS identification of conjugated fatty acid positional isomers. J Am Oil Chem Soc. (DOI : 10.1007/s11746-012-2142-7).
Philippaerts A, Goossens S, Jacobs PA, Sels BF. (2011) Catalytic Production of Conjugated Fatty Acids and Oils. ChemSusChem. 4:684-702.
Krompiec S, Penczek R, Krompiec M, Pluta T, Ignasiak H, Kita A, Michalik S, Matlengiewicz M, Filapek M. (2009) Transition Metals for Conjugation of Polyunsaturated Acids and Their Esters. Current organic chemistry. 13:896-913.
Bailey A, Feuge R. (1943) Laboratory Deodorizer for Fats and Oils. Ind. Eng. Chem. Anal. Ed., 15 (4): 280-281.
An Philippaerts,[a] Steven Goossens,[a] Walter Vermandel,[a] Moniek Tromp,[b] Stuart Turner,[c] Jan Geboers,[a] Gustaaf Van Tendeloo,[c] Pierre A. Jacobs,[a] and Bert F. Sels*[a] (2011) Design of Ru-Zeolites for Hydrogen-Free Production of Conjugated Linoleic Acids. ChemSusChem 2011, 4, 757-767.
Montgomery, D. C. Design and Analysis of Experiments, 5th edition, John Wiley & Sons, New York, 2001.
Ecker, J., G. Liebisch, W. Patsch, and G. Schmitz, The conjugated linoleic acid isomer trans-9, trans-11 is a dietary occurring agonist of liver x receptor, abstract.
Adolf, R., Preparation of methyl cis-9, trans-11—and trans-9, trans-11-octadecadienoate-17, 17, 18, 18-d4, two of the isomers of conjugated linoleic acid, abstract.
Kishino, S., J. Ogawa, Y. Omura, K. Matsumura, and S. Shimizu, Conjugated linoleic acid production from linoleic acid by lactic acid bacteria, abstract.
Ogawa, J., Kishino, S., A, Ando, S. Sugimoto K. Mihara, and S. Shimizu, Production of conjugated fatty acids by lactic acid bacteria, abstract.
Coakley, M., M. C. Johnson, E. McGrath, S. Rahman, R. P. Ross, G. F. Fitzgerald, R. Devery, and C. Stanton, Intestinal bifidobacteria that produce trans-9, trans-11 conjugated linoleic acid: A fatty acid with antiproliferative activity against human colon SW480 and HT-29 cancer cells, abstract.
Macouzet, M., B. H. Lee, and N. Robert, Production of conjugated linoleic acid by probiotic *Lactobacillus acidophilus* La-5, abstract.
Delmonte, P., J. A. G.Roach, M. M. Mossoba, G. Losi, and M. P. Yurawecz, Synthesis, isolation, and GC analysis of all the 6, 8-to 13, 15-cis/trans conjugated linoleic acid isomers, abstract.
Yang, L., S. Y. V. Yeung, Y. Huang, H. Q. Wang, and Z. Y. Chen, Preferential incorporation of trans, trans-conjugated linoleic acid isomers into the liver of suckling rats, abstract.
Nichols, Jr., P. L., S. F. Herb, and R. W. Riemenschneider, Isomers of conjugated fatty acids. I. Alkali-isomerized linoleic acid, abstract.
Jain, V. P. , A. Proctor, and W. Gammill, Comparative Study of High-Linoleic Acid Vegetable Oils for the Production of Conjugated Linoleic Acid, abstract.
Jain, V. P. , A. Proctor, and T. Tokle, Effect of Minor Oil Constituents on Soy Oil Conjugated Linoleic Acid Production, J. Agric. & Food Chem 57:8989, 2009.
Jain, V. P. , A. Proctor, and R. Lall, Conjugated Linoleic Acid-Rich Soy Oil Tricylcylglycerol Identification, 2009 J. Agric & Food Chem 57(5) 1727.
U. Shah and A. Proctor. 2010. Separation of CLA Fatty Acid Isomers from CLA-rich Soy Oil by Reverse Phase Gradient HPLC. American Oil Chemists Annual Meeting, Phoenix, AZ, May 19, 2010.
Jiang, Q., S. Christen, M. Shigenaga, and B. Ames, y-Tocopherol, the major form of vitamin E in the US diet, deserves more attention, 2001 Am. J. Clin. Nutr 74:714.
Gangidi, RR. and Proctor, A. 2004. Photochemical production of conjugated linoleic acid from soy oil Lipids 39:577-582.
Jain, V. and Proctor, A. 2007 Production of conjugated linoleic acid-rich potato chips. J. Food Sci. 72:75-78.

(56) References Cited

OTHER PUBLICATIONS

R. T. Baublils RT, Pohlman, FW , A.H . Brown Jr. Johnson, Z.B. A. Proctor, Sawyer P. and Oias-Morse P. Galloway, D.L. 2007. Injection of conjugated linoleic acid into beef strips Meat Science 75.84-93.
Jain, V.P., Tokle, T. , Kelkar, S. and Proctor A. 2008. Effect of degree of processing on soy oil conjugalted linoleic acid yields J. Ag. Food Chem. 56:8174-8178.
Proctor, A. and Jain, V. 2009. A novel CLA Production method comes to light. Inform 20280-281.
Kadamne, J., Jain, V.P , Selah, M, Proctor, A. 2009. Measurement of conjugated linoleic acid in CLA rich oil by ATR-FTIR, J. Ag. Food Chem. 57: 10483-10488.
Kadamne, J. and Proctor, A. 2010. Rapid oil extraction from potato chips. J . Am Oil Chem Soc.87:835-836.
Kadamne, J., Castrodale, C. and Proctor, A. 2011. Measurement of Conjugated Linoleic Acid (CLA) in CLA-Rich Potato chips by ATR-FTIR Spectroscopy. J . Ag. Food Chem in press.
Rahul Lall , Vishal Jain and A. Proctor. 2009. A Rapid, Micro FAME Preparation Method for Vegetable Oil Fatty Acid Analysis by Gas Chromatography. American Oil Chemists Annual Meeting, Orlando, FL, May 6, 2009.
V. P. Jain and A. Proctor. 2005. Conjugated linoleic acid synthesis from soy oil by photo isomerization. 1FT Annual Meeting. New Orleans, LA. Jul. 19, 2005.
Tanushree Tokle, V. Jain and A. Proctor. 2009. Effect of Minor Oil Constituents on Soy Oil CLA Yields and Oxidative Stability. American Oil Chemists Annual Meeting, Orlando, FL, May 6, 2009.
A. Proctor and V.P. Jain. 2006. Production of CLA rich soy oil in the session Nutraceuticals and Bioactives in Edible Oils and their Processing Co-Products, at the American Oil Chemists Society World Conference and Exhibition on Oilseed and Vegetable Oil Utilization. Instanbul, Turkey. Aug. 16, 2006.
V. Jain and A. Proctor. 2009. Catalyst Removal from Photoirradiated Soy Oil to Obtain CLA-rich Soy Oil for Food Applications. American Oil Chemists Annual Meeting, Orlando, FL, May 6, 2009.
Jeta Kadamne, Vishal Jain and A. Proctor. 2009. ATR-FTIR Measurement of Conjugated Linoleic Acid (CLA) in CLA- rich Soybean Oil. American Oil Chemists Annual Meeting, Orlando, FL, May 4, 2009.
R. Lall, V. Jain, A. Proctor. 2008. HPLC Analysis of Triacylglycerol in CLA Enriched-Soy Oil: Role of Standards. American Oil Chemists Annual Meeting, Seattle, WA, May 19, 2008.
Shivangi Kelkar, Mi Jin Cho, A. Proctor. 2008. Oxidative Stability of Conjugated Linoleic Acid Rich Soy Oil, American Oil Chemists Annual Meeting, Seattle, WA, May 19, 2008.
W. Gilbert, V. Gadang, A. Proctor, V. Jain, L. Kalwa, and L Devareddy. 2010.The Anti-Obesity Effects of Dietary Trans-Trans Conjugated Linoleic Acid-Rich Soy Oil on Fa/Fa Obese Zucker Rats., American Oil Chemists Annual Meeting, Phoenix, AZ, May 17, 2010.
V. Jain, A. Proctor. 2008. Optimization of Pilot Scale Production of Conjugated Linoleic Acid Rich Soy Oil by Photo-Isomerization. American Oil Chemists Annual Meeting, Seattle, WA, May 19, 2008.
V. Jain, T. Tokle, S. Kelkar, A. Proctor. 2008. Conjugated Linoleic Acid Levels and Oxidation Properties of Soy Oil at Different Steps of Refining. American Oil Chemists Annual Meeting, Seattle, WA, May 19, 2008.
Patcharin Pakdeechanuan et al: "Effects of Rhodium Heterogeneous Catalyst and Isomerization Conditions on Linoleic Acid Conjugation of Soybean Oil" Journal of Agricultural and Food Chemistry, vol. 53, No. 4, Feb. 1, 2005, pp. 923-927.
Andreas Bernas et al: "Isomerization of linoleic acid over supported metal catalysts", Applied Catalysis A: General, Elsevier Science, Amsterdam, NL, vol. 245, Jun. 10, 2003, pp. 257-275.
Kreich M et al: "Direct conversion of Linoleic acid over Silver catalysts in the presence of H2: an unusual way towards conjugated linoleic acids", Angewandte Chemie International Edition, Wiley—V C H Verlag GMBH & Co. KGAA, DE, vol. 44, No. 47, Dec. 2, 2005, pp. 7800-7804.
Patcharin Pakdeechanuan et al: "Effects of Rhodium Heterogeneous Catalyst and Isomerization Conditions on Linoleic Acid Conjugation of Soybean Oil", Journal of Agricultural and Food Chemistry, vol. 53, No. 4, Feb. 1, 2005, pp. 923-927, XP055107501, ISSN: 0021-8561.
Andreas Bernas et al: "Isomerization of linoleic acid over supported metal catalysts", Applied Catalysis A: General, Elsevier Science, Amsterdam, NL, vol. 245, Jun. 10, 2003, pp. 257-275, XP002676147, ISSN: 0926-860X.
Kreich M et al: "Direct conversion of Linoleic acid over Silver catalysts in the presence of H2: an unusual way towards conjugated linoleic acids", Angewandte Chemie International Edition, Wiley—V C H Verlag GMBH & Co. KGAA, DE, vol. 44, No. 47, Dec. 2, 2005, pp. 7800-7804, XP002384645, ISSN: 1433-7851.
PCT/US2014/015139 International Search Report and the Written Opinion of the International Searching Authority.
EP 13195571European Search Report.

* cited by examiner

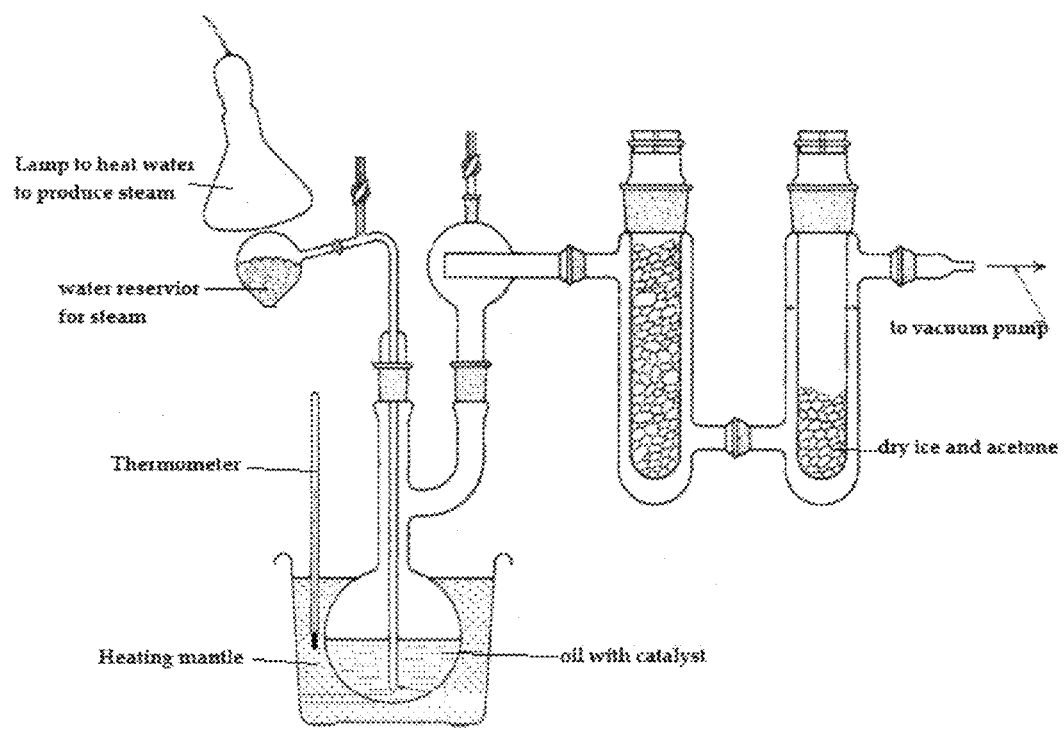

CONJUGATED LINOLEIC ACID RICH VEGETABLE OIL PRODUCTION FROM LINOLEIC RICH OILS BY HETEROGENEOUS CATALYSIS

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates generally to conjugated linoleic acid (CLA)-rich vegetable oil production from linoleic rich oils by heterogeneous catalysis, and in particular to a process for producing CLA-rich oil by isomerizing linoleic acid in triacylglyceride vegetable oils to CLA by low pressure/high temperature catalysis.

2. Description of the Related Art

CLA is a group of positional and geometric isomers of octadecadienoic acid with conjugated double bonds. CLA has anti-carcinogenic, anti-atherogenic, anti-diabetic and anti-obesity properties, along with the ability to increase lean body mass and to protect against immune induced body wasting disease, chronic inflammatory disease, cancer and to provide other positive health effects.

CLA is found naturally in dairy and beef products at levels of approximately 0.3-0.8% (w/w) of the fat as bovine rumen fermentation products. The current human intake of CLA is, however, approximately ten (10) times less than the 3 g/day minimum value recommended as being necessary to produce desirable physiological health effects. Obtaining the estimated optimum dietary CLA levels from natural beef and dairy sources would increase the total fat and saturated fat intake and increase the negative health risks associated with dietary animal fats. Therefore, a concentrated source of dietary CLA that is low in saturated fat and cholesterol is desirable.

Soy oil is the most commonly used vegetable oil in United States, and it contains about 50% linoleic acid. Other vegetable oils high in linoleic acid include sunflower (57%), corn (55%), cottonseed (50%) and peanut (50%). CLA fatty acid has been produced historically by fermentation and enzyme technology. CLA in vegetable oil has also been produced by converting linoleic acid to CLA using iodine by homogeneous photo-catalysis. A drawback of this process is the removal of iodine in order for the resulting CLA-rich oil to be suitable for human consumption.

It is therefore desirable to provide CLA-rich vegetable oil produced from linoleic rich oils using heterogeneous catalysis.

It is further desirable to provide a process for producing CLA-rich oil by isomerization of linoleic acid in triacylglyceride vegetable oils to CLA using low pressure/high temperature catalysis.

It is still further desirable to provide a process for producing a 20% CLA-rich oil that requires only post-processing catalyst removal.

It is yet further desirable to provide a process for rapidly producing CLA-rich oils from linoleic rich oils using heterogeneous catalysis that may utilize a continuous fixed bed reactor and/or a continuous stirred tank reactor for a cost effective and energy efficient process.

It is yet further desirable to provide a process for producing CLA-rich oils from linoleic rich oils using heterogeneous catalysis that is an environmentally-friendly process in contrast to alkali isomerization.

It is still further desirable to provide a process for producing CLA-rich oils from linoleic rich oils using heterogeneous catalysis that does not require any solvent or any chemical other than catalyst.

It is yet further desirable to provide a process for producing CLA-rich oils from linoleic rich oils using heterogeneous catalysis in the absence of iodine and with a metal catalyst that can be easily removed and reused.

It is yet further desirable to provide a process for producing CLA-rich oils from linoleic rich oils using heterogeneous catalysis that utilizes continuous steam injection to remove any rancidity volatiles in linoleic acid-rich oil.

BRIEF SUMMARY OF THE INVENTION

In general, in a first aspect, the invention relates to a process for producing conjugated linoleic acid-rich oil. The process includes the steps of mixing a linoleic acid-rich oil with a catalytic amount of a transition metal to form an oil-catalyst mixture, and catalysis of the oil-catalyst mixture to produce the conjugated linoleic acid-rich oil. The process can also include the step of extracting the metal from the conjugated linoleic acid-rich oil, such as via filtration or centrifugation. The linoleic acid-rich oil can be a triacylglyceride vegetable oil, such as soy, sunflower, corn, cottonseed or peanut oil.

The catalysis step of the process can further include catalysis of the oil-catalyst mixture in low pressure conditions and high temperature conditions to produce the conjugated linoleic acid-rich oil. The oil-catalyst mixture can be catalyzed for up to approximately 192 minutes, such as between approximately 108 minutes and approximately 180 minutes, to produce the conjugated linoleic acid-rich oil. Further, the catalysis can be processed between approximately 1 mm Hg and approximately 2 mm Hg. Additionally, the catalysis can take place at temperature conditions between approximately 197° C. and approximately 282° C., such as between approximately 210° C. and approximately 240° C. Furthermore, the transition metal can be ruthenium, rhodium, silver or nickel having a concentration between 0.21% to approximately 1%, such as approximately 0.64% of a ruthenium catalyst or approximately 1% of a nickel catalyst.

In general, in a second aspect, the invention relates to a process for enriching a linoleic acid-rich vegetable oil by distilling the linoleic acid-rich vegetable oil in the presence of a transition metal catalyst to produce a conjugated linoleic acid-rich oil. The linoleic acid-rich oil can be a triacylglyceride vegetable oil, such as soy, sunflower, corn, cottonseed or peanut oil. The process can further include extracting the metal catalyst from the conjugated linoleic acid-rich oil, such as via filtration or centrifugation.

The distilling step of the process can further include vacuum steam distilling of the oil-catalyst mixture in low pressure conditions and high temperature conditions to produce the conjugated linoleic acid-rich oil. The linoleic acid-rich vegetable oil and transition metal catalyst can be distilled for up to approximately 192 minutes, such as between approximately 108 minutes and approximately 180 minutes. Further, the vacuum distilling distillation can be between approximately 1 mm Hg and approximately 2 mm Hg and at temperature conditions between approximately 197° C. and approximately 282° C., such as between approximately 210°

C. and approximately 240° C. Furthermore, the transition metal can be ruthenium, rhodium, silver or nickel having a concentration between 0.21% to approximately 1%, such as approximately 0.64% of a ruthenium catalyst or approximately 1% of a nickel catalyst.

In general, in a third aspect, the invention relates to a conjugated linoleic acid-rich oil produced by the process described herein. The conjugated linoleic acid-rich oil can be enriched with up to approximately 21% conjugated linoleic acid. The linoleic acid-rich oil can be a triacylglyceride vegetable oil.

In general, in a fourth aspect, the invention relates to an enriched food product prepared using the conjugated linoleic acid-rich oil from the process described herein. The food product can include margarine, dressing or chips.

BRIEF DESCRIPTION OF THE DRAWINGS

FIG. 1 is a schematic diagram of an example of a deodorization process in an aspect of the CLA-rich vegetable oil production from linoleic rich oils by heterogeneous catalysis disclosed herein.

Other advantages and features of the invention will be apparent from the following description and from the claims.

DETAILED DESCRIPTION OF THE INVENTION

The processes and systems discussed herein are merely illustrative of specific manners in which to make and use this invention and are not to be interpreted as limiting in scope.

While the processes and systems have been described with a certain degree of particularity, it is to be noted that many variations and modifications may be made in the details of the sequence and the arrangement of the processes and systems without departing from the scope of this disclosure. It is understood that the processes and systems are not limited to the embodiments set forth herein for purposes of exemplification.

The invention is generally directed to a heterogeneous catalytic vacuum distillation process that utilizes high temperature conditions to isomerize linoleic acid in triacylglyceride vegetable oils to CLA in order to produce CLA-rich oils. After processing, the catalyst may be removed by filtration or centrifugation to obtain high quality, CLA-rich oils. The heterogeneous catalysis utilizes a metal catalyst that can be selected from any suitable transition metal, such as ruthenium, rhodium, silver or nickel. The process is a two-phase system (oil/catalyst) using conditions with low pressure, between approximately 1 to 2 mm of Hg pressure, high temperature, above about 200° C., and a continuous flow, such as at about 0.4 ml/min steam flow, to produce a 20% CLA-rich oil in less than 2 hours. The CLA-rich oils may then serve as a potent and bioactive nutraceutical. In addition, the CLA-rich oils can be incorporated into various food products, such as a CLA-rich dressing, margarine or chips.

EXAMPLES

The CLA-rich vegetable oil production from linoleic rich oils by heterogeneous catalysis disclosed herein is further illustrated by the following examples, which are provided for the purpose of demonstration rather than limitation. Although soy oil was used in the following examples, any linoleic acid-rich oil can be used.

Example 1

Studies were conducted in duplicate to screen nickel, ruthenium, silver and rhodium catalysts for isomerization of linoleic acid to CLA. Rhodium on carbon with 5% loading (Sigma-Aldrich Product number: 206164), ruthenium (Sigma-Aldrich Product number: 206180), nickel on silica/alumina ~65 wt. % loading (Sigma-Aldrich Product number: 208779). Silver powder instead of silver coated on carbon was used because silver is not commercially available coated on carbon or other support.

Catalyst concentrations and processing conditions are in Table 1 below. Duplicate samples of 250 mL of fully refined oil were processed for 90 minutes at their optimum temperature of each catalyst. Control experiments were also conducted using iodine (0.35%) and tocopherols (0.14%) catalysts dissolved in oil.

TABLE 1

Commercial metal catalysts screening for CLA-rich oil production relative to production with iodine and mixed tocopherols.

| Table 1 Treatments | Conc. of catalyst (%) | Temp (° C.) | Ratio (c, t:t, t) | Total mean CLA (%) | PV | FFA (% as oleic) |
|---|---|---|---|---|---|---|
| IODINE AND MT | | | | | | |
| 1  Iodine | 0.35 | 255 | 12 | 27.50 ± 0.12 | 0.64 | 0.040 |
| MIXED TOCOPHEROLS | | | | | | |
| 2  Mixed Tocopherols | 0.14 | 255 | 0.17 | 1.84 ± 0.42 | 0.24 | 0.030 |
| 3  Mixed Tocopherols | 1.40 | 255 | .006 | 1.813 ± 0.32 | 0.32 | 0.032 |
| RUTHENIUM | | | | | | |
| 1  Ruthenium on carbon (5% load) | 0.08 | 255 | 0.85 | 4.14 ± 0.35 | 0..41 | 0.042 |
| 2  Ruthenium on carbon (5% load) | 0.08 | 165 | 0.86 | 4.09 ± 0.23 | 0.39 | 0.034 |
| 3  Ruthenium on carbon (5% load) + 0.14% MT | 0.08 | 165 | 1.51 | 5.21 ± 0.44 | 0.34 | 0.032 |
| 4  Ruthenium on carbon (5% load) | 0.32 | 165 | 3.03 | 10.52 ± 0.86 | 0.38 | 0.041 |
| 5  Ruthenium on carbon (5% load) + 1400 MT | 0.32 | 165 | 2.80 | 9.043 ± 0.62 | 0.32 | 0.032 |
| 6  Ruthenium on carbon (5% load) | 0.48 | 165 | 2.73 | 13.78 ± 0.81 | 0.55 | 0.04 |
| 7  Ruthenium on carbon (5% load) | 0.64 | 165 | 2.18 | 14.972 ± 0.83 | 0.62 | 0.042 |

TABLE 1-continued

Commercial metal catalysts screening for CLA-rich oil production relative to production with iodine and mixed tocopherols.

| Table 1 Treatments | Conc. of catalyst (%) | Temp (°C.) | Ratio (c, t:t, t) | Total mean CLA (%) | PV | FFA (% as oleic) |
|---|---|---|---|---|---|---|
| RHODIUM | | | | | | |
| 1 Rhodium on carbon (5% load) | 0.015 | 200 | 0.17 | 2.37 ± 0.30 | 0.52 | 0.032 |
| 2 Rhodium on carbon (5% load) | 0.32 | 200 | 1.34 | 10.83 ± 0.45 | 0.73 | 0.05 |
| OTHERS | | | | | | |
| 1 Silver powder 1000 mesh (10 mic) | 1 | 200 | 0.007 | 1.46 ± 0.25 | 0.36 | 0.021 |
| 2 Nickel 400 mesh or 37 mic | 1 | 200 | 0.01 | 1.10 ± 0.22 | 0.43 | 0.023 |
| 3 Nickel (65% loading on carbon) | 1 | 200 | 0.24 | 1.831 ± 0.32 | 0.50 | 0.035 |

Heterogeneous catalyzed oils were then filtered and oil fatty acid composition determined by GC fatty acid methyl ester analysis in duplicate. Oil quality was determined by measuring peroxide value and free fatty acid value in duplicate.

As the data in Table 1 illustrates, ruthenium and rhodium produced higher but statistically similar CLA levels at a concentration of 0.32% than other metal catalysts. Since rhodium is 10 times more expensive than ruthenium, ruthenium was selected as the most viable metal for CLA production by heterogeneous catalytic deodorization process. Ruthenium was further optimized as an economically viable conjugation catalyst, and preliminary screening showed that increasing the ruthenium catalyst concentration increases CLA yields. Around 15% CLA was produced at a catalyst level of 0.64% at 165° C. over 90 min.

Transition metals contain free and vacant d-orbitals, which can interact with pi-bonds of linoleic acid, and which are capable of activating a nearby C—H bond leading to bond migration. Such interaction destabilizes the native structure allowing the more stable CLA conjugated system to form and be released from the catalyst.

Example 2

To optimize conditions by a central composite rotatable experimental design using a Ruthenium catalyst (Ru loaded on carbon) was used with 5 levels of 3 variables (catalyst concentration, time, and temperature) (Table 2). The results of Example 1 were used to select the center point for experimental design to determine the effect of variables on CLA yields above and below the center point.

TABLE 2

Central Composite Rotatable Design of Example 2 for Optimization of CLA Production Over a Broad Range of Temperatures (90-240° C.), Times (40-140 min) and Ru Catalyst Concentrations (0.21-0.75%).

| Variables | Levels | | | | |
|---|---|---|---|---|---|
| | −1.682 | −1 | 0 | 1 | 1.682 |
| Temperature (° C.) | 90 | 120 | 165 | 210 | 240 |
| Time (min) | 40 | 60 | 90 | 120 | 140 |
| Catalyst Concentration (%) | 0.21 | 0.32 | 0.48 | 0.64 | 0.75 |

| Sr. no. | Catalyst Conc. (%) | Time (min) | Temperature (° C.) | % CLA (rep 1) | % CLA (rep 2) | % CLA mean | SD | c, t:t, t ratio | PV | FFA |
|---|---|---|---|---|---|---|---|---|---|---|
| 1 | 0.48 | 140 | 165 | 11.09 | 10.78 | 10.94 | ±0.22 | 2.562 | 0.32 | 0.031 |
| 2 | 0.48 | 40 | 165 | 6.42 | 6.10 | 6.26 | ±0.23 | 2.327 | 0.34 | 0.040 |
| 3 | 0.48 | 90 | 240 | 14.43 | 14.02 | 14.23 | ±0.29 | 1.518 | 0.24 | 0.032 |
| 4 | 0.64 | 120 | 120 | 2.34 | 2.22 | 2.28 | ±0.08 | 0.54 | 0.42 | 0.050 |
| 5 | 0.75 | 90 | 165 | 6.82 | 6.60 | 6.71 | ±0.15 | 2.139 | 0.32 | 0.053 |
| 6 | 0.32 | 120 | 120 | 2.36 | 2.26 | 2.31 | ±0.07 | 0.56 | 0.48 | 0.054 |
| 7 | 0.32 | 120 | 210 | 13.23 | 13.44 | 13.33 | ±0.15 | 1.98 | 0.28 | 0.024 |
| 8 | 0.21 | 90 | 165 | 3.64 | 4.02 | 3.83 | ±0.26 | 7.49 | 0.38 | 0.028 |
| 9 | 0.64 | 60 | 120 | 0.17 | 0.15 | 0.16 | ±0.01 | (no tt) | 0.40 | 0.055 |
| 10 | 0.48 | 90 | 165 | 9.84 | 9.33 | 9.59 | ±0.36 | 5.38 | 0.38 | 0.020 |
| 11 | 0.48 | 90 | 90 | 0.16 | 0.16 | 0.16 | ±0.01 | No tt | 0.54 | 0.056 |
| 12 | 0.32 | 60 | 210 | 12.24 | 11.74 | 11.99 | ±0.36 | 3.822 | 0.34 | 0.043 |
| 13 | 0.48 | 90 | 165 | 10.20 | 9.58 | 9.89 | ±0.44 | 5.36 | 0.32 | 0.033 |
| 14 | 0.32 | 60 | 120 | 0.17 | 0.16 | 0.17 | ±0.01 | No tt | 0.49 | 0.054 |
| 15 | 0.64 | 60 | 210 | 16.89 | 16.14 | 16.51 | ±0.53 | 1.944 | 0.36 | 0.034 |
| 16 | 0.64 | 120 | 210 | 20.87 | 19.95 | 20.41 | ±0.65 | 2.20 | 0.42 | 0.043 |

The ruthenium catalyst is on a carbon support consisting of a 19 microns particle with total surface area surface area of 900 m² per gram, The ruthenium catalyst has a surface area of 13 m² per gram and moisture content of <5% (Sigma-Aldrich Product number: 206180).

Two hundred and fifty milliliter samples were processed in duplicate for each set of processing conditions. Oils were then filtered and oil fatty acid composition determined by gas chromatography free fatty acid (FFA) methyl ester analysis in duplicate. Oil quality was determined by measuring the peroxide value (PV) and free fatty acid value in duplicate.

As the data in Table 2 illustrates, 0.64% ruthenium at 210° C. over 120 minutes produced 20% CLA-rich oil, which were the conditions that produced most CLA. Yields increased with temperature, time and catalyst concentration but time and temperature had the greatest effect on CLA yields.

Example 3

To further optimize the time and temperature conditions for a catalyst concentration fixed at 0.64% (ruthenium on carbon), a central composite rotatable design was utilized with 5 levels of 2 variables (time and temperature) (Table 3). The results of Example 2 were used to select the higher temperature and time settings for the experimental design to determine the effect of variables on CLA yields for time and temperature conditions over the ones used in Example 2. The objective of Example 3 was based on the hypothesis predicted by experimental design of Example 2 that higher temperatures and times would give greater CLA yields at a fixed catalyst concentration (0.64%), as further loading of the catalyst coated on carbon increased the viscosity of oil which would increase process cost and cause filtration problems.

TABLE 3

Central Composite Rotatable Design for Example 3 for Optimization CLA-Rich Oil Production Over a High Temperature (197-282° C.) Range and Longer Times (108-192 min) than in Example 2, with 0.64% Ru catalyst.

| Variables | Levels | | | | |
|---|---|---|---|---|---|
| | −1.682 | −1 | 0 | 1 | 1.682 |
| Temperature (° C.) | 197 | 210 | 240 | 270 | 282 |
| Time (min) | 108 | 120 | 150 | 180 | 192 |

| No. | time (min) | temperature | CLA (rep1) | CLA (rep 2) | mean | SD | Ratio (c, t:t, t) | PV | FFA |
|---|---|---|---|---|---|---|---|---|---|
| 1 | 180 | 210 | 17.36 | 16.54 | 16.95 | 0.58 | 1.68 | 0.43 | 0.05 |
| 2 | 108 | 240 | 20.90 | 21.20 | 21.05 | 0.21 | 1.75 | 0.44 | 0.04 |
| 3 | 180 | 270 | 18.62 | 19.60 | 19.11 | 0.69 | 151 | 0.65 | 0.06 |
| 4 | 192 | 240 | 17.56 | 17.10 | 17.33 | 0.33 | 1.08 | 0.53 | 0.06 |
| 5 | 150 | 282 | 18.48 | 18.20 | 18.34 | 0.20 | 1.35 | 0.64 | 0.05 |
| 6 | 150 | 240 | 17.05 | 17.45 | 17.25 | 0.28 | 0.93 | 0.49 | 0.05 |
| 7 | 120 | 210 | 19.04 | 19.60 | 19.32 | 0.40 | 2.51 | 0.45 | 0.05 |
| 8 | 150 | 197 | 14.90 | 15.34 | 15.12 | 0.31 | 2.09 | 0.36 | 0.04 |
| 9 | 150 | 240 | 17.58 | 17.10 | 17.34 | 0.34 | 0.95 | 0.45 | 0.05 |
| 10 | 120 | 270 | 17.80 | 17.46 | 17.63 | 0.24 | 0.99 | 0.68 | 0.06 |

As the data in Table 3 illustrates, CLA yields at higher temperatures and longer times with 0.64% ruthenium catalyst resulted in less CLA produced relative to Example 2. A maximum of 21.05% CLA can be obtained at 240° C. temperature for 108 min.

Whereas, the processes and systems have been described in relation to the drawings and claims, it should be understood that other and further modifications, apart from those shown or suggested herein, may be made within the scope of this invention.

What is claimed is:

1. A process for producing conjugated linoleic acid-rich oil, said process comprising the steps of:
   a. mixing a linoleic acid-rich oil with a catalytic amount of ruthenium, rhodium, silver, or nickel on a carbon or silica support to form an oil-catalyst mixture; and
   b. heterogeneous catalysis via vacuum steam distillation of said oil-catalyst mixture at a pressure between approximately 1 mm Hg and approximately 2 mm Hg, at a temperature between 221° C. and approximately 282° C., and for up to approximately 192 minutes to produce said conjugated linoleic acid-rich oil.

2. The process of claim 1 further comprising the step of extracting said metal from said conjugated linoleic acid-rich oil.

3. The process of claim 2 further comprising the step of extracting said metal from said conjugated linoleic acid-rich oil via filtration or centrifugation.

4. The process of claim 1 wherein said linoleic acid-rich oil is a triacylglyceride vegetable oil.

5. The process of claim 4 wherein said triacylglyceride vegetable oil is selected from the group consisting of soy, sunflower, corn, cottonseed or peanut oil.

6. The process of claim 1 wherein said catalysis step further comprises heterogeneous catalysis via vacuum steam distillation of said oil-catalyst mixture for between approximately 108 minutes and approximately 192 minutes to produce said conjugated linoleic acid-rich oil.

7. The process of claim 1 wherein said catalysis step further comprises heterogeneous catalysis via vacuum steam distillation of said oil-catalyst mixture for between approximately 60 minutes and approximately 180 minutes to produce said conjugated linoleic acid-rich oil.

8. The process of claim 1 wherein said temperature conditions are between greater than 221° C. and approximately 240° C.

9. The process of claim 1 wherein said catalysis step further comprises heterogeneous catalysis via vacuum steam distillation of said oil-catalyst mixture in a continuous flow bath.

10. The process of claim 1 wherein said catalysis step further comprises a two-phase heterogeneous catalysis via vacuum steam distillation of said oil-catalyst mixture.

11. The process of claim 1 wherein said catalytic amount of said ruthenium, rhodium, silver, or nickel comprises between approximately 0.64% and approximately 1% of said ruthenium, rhodium, silver, or nickel.

12. The process of claim 1 wherein said catalytic amount of said ruthenium, rhodium, silver, or nickel comprises between 0.21% to approximately 1% of said ruthenium, rhodium, silver, or nickel.

13. The process of claim 12 wherein said catalytic amount of said ruthenium, rhodium, silver, or nickel is approximately 0.64% of a ruthenium catalyst or approximately 1% of a nickel catalyst.

14. A process for enriching a linoleic acid-rich vegetable oil, said process comprising the step of vacuum steam distilling said linoleic acid-rich vegetable oil in the presence of a transition metal catalyst, in the absence of a solvent or iodine, at a temperature between 221° C. and approximately 282° C., at a pressure between approximately 1 mm Hg and approximately 2 mm Hg, and for up to approximately 192 minutes to produce a conjugated linoleic acid-rich oil; and
    wherein said transition metal catalyst is between 0.21% to approximately 1% of a ruthenium, rhodium, silver, or nickel catalyst.

15. The process of claim 14 further comprising the step of extracting said metal catalyst from said conjugated linoleic acid-rich oil.

16. The process of claim 15 further comprising the step of extracting said metal catalyst from said conjugated linoleic acid-rich oil via filtration or centrifugation.

17. The process of claim 14 wherein said linoleic acid-rich oil is a triacylglyceride vegetable oil.

18. The process of claim 17 wherein said triacylglyceride vegetable oil is selected from the group consisting of soy, sunflower, corn, cottonseed or peanut oil.

19. The process of claim 14 wherein said step of steam distilling further comprises vacuum steam distilling said linoleic acid-rich vegetable oil approximately 60 minutes to approximately 192 minutes to produce said conjugated linoleic acid-rich oil.

20. The process of claim 19 wherein said step of steam distilling further comprises vacuum steam distilling said linoleic acid-rich vegetable oil for between approximately 108 minutes and approximately 180 minutes to produce said conjugated linoleic acid-rich oil.

21. The process of claim 14 wherein said temperature is between greater than 221° C. and approximately 240° C.

22. The process of claim 14 wherein said steam distilling step further comprises vacuum steam distilling said linoleic acid-rich vegetable oil in a continuous flow bath.

23. The process of claim 22 wherein said steam distilling step further comprises vacuum steam distilling said linoleic acid-rich vegetable oil at said temperature between greater than 221° C. and approximately 240° C. for between approximately 108 minutes and approximately 180 minutes to produce said conjugated linoleic acid-rich oil.

24. The process of claim 14 wherein said transition metal catalyst comprises between 0.32% to approximately 0.75% of ruthenium catalyst on a carbon support.

25. The process of claim 14 wherein said transition metal catalyst is approximately 0.64% of a ruthenium catalyst or approximately 1% of a nickel catalyst on a carbon support.

* * * * *